United States Patent [19]

Justus

[11] Patent Number: 4,549,415
[45] Date of Patent: Oct. 29, 1985

[54] CONTINUOUS COUNTERFLOW BELT WASHER

[75] Inventor: Edgar J. Justus, Beloit, Wis.

[73] Assignee: Beloit Corporation, Beloit, Wis.

[21] Appl. No.: 463,620

[22] Filed: Feb. 3, 1983

[51] Int. Cl.[4] .......................... D21C 9/00; D21C 9/02
[52] U.S. Cl. .................... 68/158; 68/181 R; 162/60; 162/380
[58] Field of Search ............ 162/60, 38, 40, 190, 162/208, 217, 380; 68/181 R, 205 R, 184, 44, 45, 148, 158; 8/156, 158

[56] References Cited

U.S. PATENT DOCUMENTS

| | | | |
|---|---|---|---|
| 2,356,285 | 8/1944 | Street | 68/22 |
| 3,469,704 | 9/1969 | Sepall | 210/401 |
| 3,739,436 | 6/1973 | Naujoks et al. | 68/181 R |
| 3,938,206 | 2/1976 | Stranger-Johanessen | 60/181 R |
| 4,014,736 | 3/1977 | Sexton | 162/60 |
| 4,154,644 | 5/1979 | Ericsson | 162/60 |
| 4,207,141 | 6/1980 | Seymour | 162/60 |
| 4,246,669 | 1/1981 | Davis | 8/156 |

Primary Examiner—Steve Alvo
Attorney, Agent, or Firm—Hill, Van Santen, Steadman & Simpson

[57] ABSTRACT

A mechanism and method for continuously washing wood pulp fibers including a looped traveling foraminous wire, a plurality of stock chambers above the wire arranged sequentially in the direction of wire travel to provide a sequence of baths submerging the wire, pumps beneath each of the baths removing water drained through the wire and pumping the water back into the next upstream bath, means feeding stock into the first bath, and means measuring the level of stock in the first bath and supplying fresh water to the last bath as a function of the level, and pressing the stock between a roll and the looped wire in the last bath and removing the stock from the roll as it is carried upwardly out of the bath.

4 Claims, 1 Drawing Figure

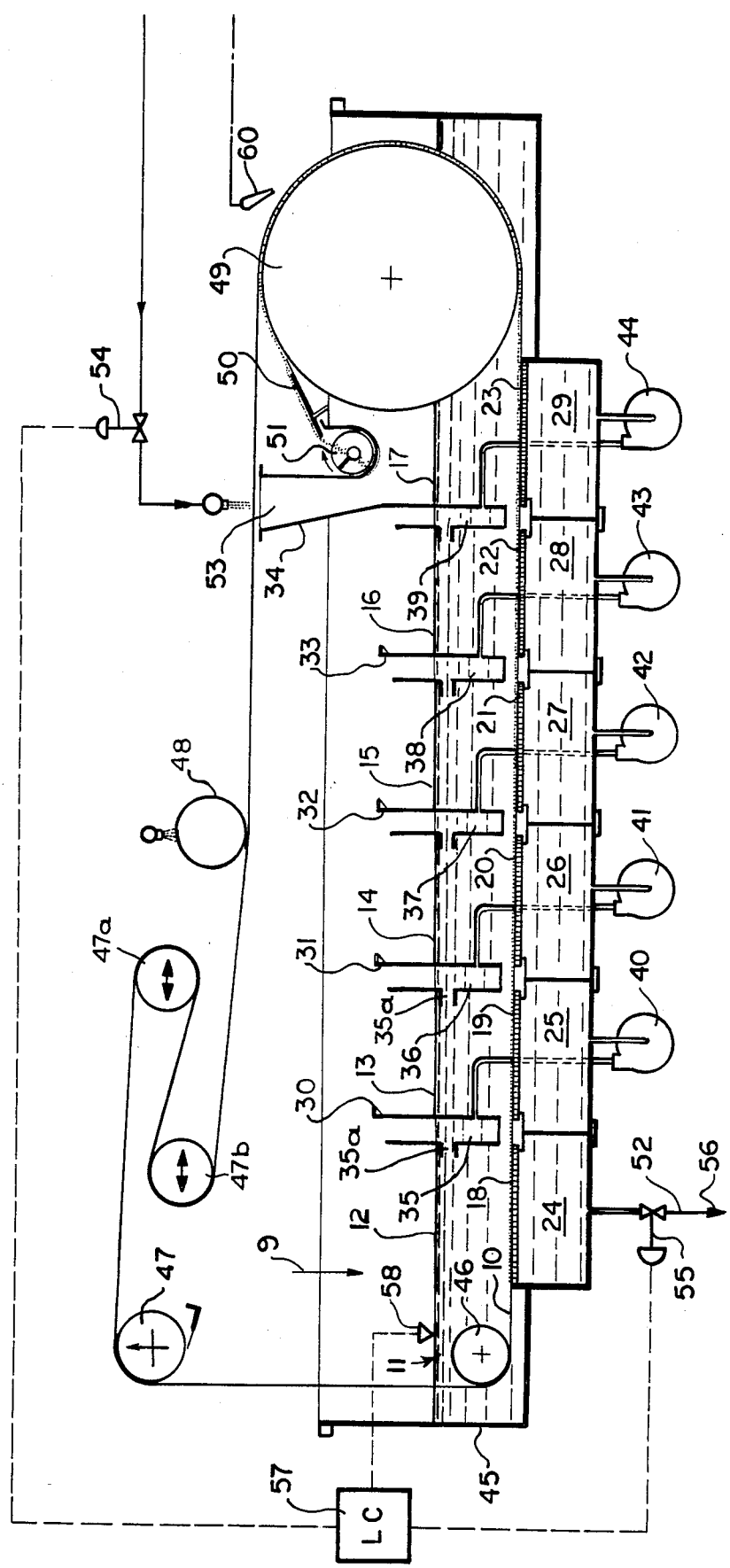

CONTINUOUS COUNTERFLOW BELT WASHER

BACKGROUND OF THE INVENTION

The present invention relates to improvements in pulp washers, and more particularly to an improved method and mechanism for continuously collecting fibers from a stock and washing the cellulose pulp fibers.

When wood is processed to obtain cellulose pulp fibers for papermaking, the process includes cooking and digesting with various pulping liquids so that the resins and materials binding the cellulose fibers are dissolved in the pulping liquor. What results is a slurry of fibers suspended in a liquid of water and spent chemicals. To further prepare the pulp for papermaking, the fibers must be collected from the liquid, the liquid removed, and the fibers washed to remove what chemicals remain with the fiber. The fibers are collected and the spent chemicals and liquor are removed to be used for further processing. If the washing can be accomplished with the addition of a minimum of clear water, a greater efficiency is achieved because the wash water dilutes the recovered liquor and adds to the cost of reprocessing the chemicals.

The methods used heretofore for the washing of stock have included spraying the stock onto the top surface of a traveling foraminous belt and removing the liquid passing through the belt from beneath the belt. A substantial disadvantage in this type of arrangement has been the creation of foam and froth on the top of the wirre which has to be removed and handled. Further, protective hoods or canopies had to be provided to handle the spray and frequently these were used for the application of a pressure onto the top of the wire to force the liquid through the wire.

An object of the present invention is to provide a continuous mechanism and method for the washing of stock which avoids disadvantages of methods and structures heretofore available and which is capable of a continued washing operation without the generation of froth and foam.

A further object of the invention is to provide an improved stock washing mechanism and method which improves the quality of the stock being removed, and which utilizes the carrier liquid in the stock for washing and subjects the fibers to a continuous rewashing process with a minimum of addition of fresh water and a minimum dilution of the liquor.

A further object of the invention is to provide a stock washer which has an improved arrangement for handling the liquors and liquid and an improved arrangement for removing the stock fibers.

A feature of the invention provides for the washing of the stock in a submerged condition wherein the stock is carried on a traveling wire beneath the surface of a bath of stock. A unique arrangement is provided for the countercurrent flow of stock and wash water to rewash the stock with removed liquor and water. Fresh water is admitted at the trailing end of a series of baths, and the stock is formed and washed on the inside of a wire loop. Drainage is established by the level of the liquid in the baths above the wire, and the fresh water added is controlled by the level of the liquid. A natural equilibrium is reached within the baths and continuous high speed washing is accomplished.

Other objects, advantages and features of the invention, as well as equivalent structures and methods which are intended to be covered herein, will become more apparent with the teaching of the principles of the invention in connection with the disclosure of the preferred embodiments in the specification, claims and drawings in which:

DESCRIPTION OF THE DRAWING

FIG. 1 is the single figure of the drawing which shows a stock washing mechanism in vertical sectional view, illustrated somewhat schematic in form, constructed and operating in accordance with the principles of the present invention.

DESCRIPTION

The fibers to be removed and washed are fed in the form of a stock slurry by supply means shown generally by the arrowed line 9 with the stock preferably being discharged beneath the surface of the liquid to reduce foaming. A stock slurry of liquor and fibers of a 1½% consistency is typical and is fed to a vat 45 containing a stock chamber 11 which submerges a lower run of a traveling foraminous wire 10. The wire 10 is in a loop guided over rolls in a horizontal run submerged beneath the bath of stock 11 with the water or liquor draining through the wire depositing the fibers on the inner surface of the wire and the passage of liquid therethrough washes the fibers.

The bath 11 is maintained above the wire in a plurality of liquid containing stock chambers 12, 13, 14, 15, 16 and 17 with the chambers being arranged sequentially, and 12 being the first chamber at the head end of the wire relative to the direction of wire travel. Inasmuch as the wire is submerged in the bath of stock, the washing and draining occurs submerged so that no frothing or foaming occur. The sequence of chambers is arranged such that the stock is sequentially washed in each chamber being subjected to a more and more pure, or more dilute wash liquid.

The wires are supported for each chamber by a series of perforate plates 18, 19, 20, 21, 22 and 23 which are suitably mounted on framework so as to support the wire in a straightline run. Drainage and washing occur downwardly with the drained liquid passing into a plurality of suction chambers 24, 25, 26, 27, 28 and 29 generally positioned below each of the liquid chambers 12 through 17.

The liquid chambers are separated from each other by vertical baffles 30, 31, 32, 33 and 34, which extend across the enclosing tank or vat 45, but are spaced from the wire 10 at their lower edge so as to provide communication between the chambers 12 through 17. While this communication is not absolutely essential, it aids in maintaining the level of the liquid equal in each of the chambers without necessitating positive level control apparatus or without controlling the pumps which pump the liquid back into the preceding chambers as will be described below.

The baffles provide one wall of an open compartment 35, 36, 37, 38 and 39. Each of the compartments has an opening 35a for the compartments 35 through which the liquid flows into the chamber 12. This opening is preferably located beneath the surface of the liquid in the chamber 12 to prevent air entrainment into the liquid. Liquid is pumped into the compartments 35 by a series of pumps 40, 41, 42, 43 and 44 which draw the liquid out of the chambers 25 through 29 respectively.

The level of liquid in each of the chambers 35 is controlled by pump pressure.

In operation, a pressure differential is created across the wire 10 in each of the chambers 12 through 16 by the pump drawing the liquid out from the lower chambers 24 through 29 and pumping it into the open compartments 35 through 39. From the compartments, the liquid flows into the chambers 12 through 16.

In each successive chamber the liquid washes through the gathered fibers on the wire 10, and fresh water is introduced into the last chamber 17 so that with each successive chamber the fibers are washed by a more clear liquid. Below the first chamber 11, the liquid flows into the lower chamber 24 and out through a removal line 52 in an amount to maintain a substantially uniform level within the chambers in the tank 45. Thus, the amount of liquid removed through the line 52 substantially equals but is slightly in excess of the liquid in the stock introduced into the chambers through the line 9. Fresh water is added in an amount predetermined necessary for the washing function. For increased washing, more fresh water is added, but this of course, will dilute the liquor being drawn off so that a desirable predetermined balance is maintained.

The liquor drawn off through the line 52 is controlled by valve 55 and delivered to a destination 56 for reusing the chemicals.

The amount of fresh water delivered to the last chamber 17 through a fresh water line 53 is controlled by a fresh water valve 54. The valve 55 for the liquor being withdrawn, and the valve 54 for the fresh water are both controlled by a level control 57 which has a sensor 58 measuring the level of liquid in the chamber 11. The level control is programmed to relate the two valve openings 54 and 55 to give the desired proportionate amount of fresh water for liquor being withdrawn at 56. The line 52 may be a dropline or also provided with a pump to provide a suction in the chamber 24 beneath the first liquid containing stock chamber 12.

The wire is carried on rolls 46, 47 and 48 with 46 being positioned at the lead end of the horizontal path of travel. The wire additionally passes over rolls 47a and 47b which are stretcher rolls movable to control the tension in the wire. Roll 48 is a guide roll for guiding the wire in its travel on the offrunning side of a collection roll 49.

As the fibers gather on the upper surface of the wire, and pass beneath the baffles 30 through 34, they are carried on the inside of the wire up over the collection roll 49 to be squeezed between the roll and the wire. The fibers are carried up out of the bath of the last chamber 17 and separate from the roll as the wire separates therefrom to be carried down and removed from the surface of the roll 49 by a doctor blade 50. The blade 50 feeds the fibers into a laterally extending screw conveyor 51 which transfers the washed fibers out of the washer to a suitable receiving means.

As the washed fibers are carried up on the wire over the roll 49, a full width spray jet 60 is directed against the outer surface of the wire. This provides additional washing, but more importantly helps loosen the mat of fibers from the wire so that they separate more easily and adhere to the smooth surfaced roll 49 when the wire 10 separates from the roll 49.

In operation the traveling foraminous wire 10 travels in a straightline supported on plates 18 through 23 submerged beneath a bath of liquid provided by the sequential chambers 12 through 17. Stock is continually delivered to the first chamber 12 through the line 9, and the stock fibers gather on the wire as they are washed by the liquid being drawn through the stock by the sequence of pumps 40 through 44. Fresh water is delivered into the last chamber 17 for the final washing through a line 53 controlled by the valve 54. The fresh water valve, and the valve 55 controlling the liquor removed are controlled by the level control 57 measuring the level in the first chamber 12 by a sensor 58.

Thus, it will be seen that I have provided an improved washer which provides the objectives and features above set forth. The washer is capable of an improved washing operation to deliver a satisfactory collected and satisfactory washed mat of fibers. The washing occurs in stages with the final stage being washed with essentially fresh water. Further, improved collection of the fibers results inasmuch as fines which first pass through the wire in the earlier chambers will collect on top of the matted fibers in the last of the chambers.

I claim as my invention:

1. A continuous wood pulp fiber washing mechanism comprising in combination:

a vat for containing stock washing water;

a traveling foraminous wire positioned to pass submerged in the vat for collecting fibers on the surface with the passage of water through the wires to wash the fibers;

a plurality of liquid containing stock chambers in the vat above the wire arrayed sequentially in the direction of wire travel for containing stock and immersing the wire and stock above the wire with a first chamber at the upstream end of the wire relative to its direction of travel and sequential chambers positioned after said chamber, the fibers being collected on the upper surface of the wire freely exposed to the water in said chambers;

baffles between each of the chambers affording controlled communication at the lower edge of the baffles between adjacent chambers;

stock delivery means for delivering stock to said first chamber;

a foraminous plate means beneath the wire;

pump means for each of the chambers drawing water through the wire beneath the plate and delivering the withdrawn water to the next sequential chamber upstream below the level of liquid in said chamber;

supply compartments having uniform fluid distributors feeding to each of the chambers and being mounted adjacent the baffles with said pump means delivering water to the next sequential chamber through said compartment; and means for removing washed pulp fibers from the wire surface following the chambers.

2. A continuous wood pulp fiber washing mechanism constructed in accordance with claim 1:

including a fresh water supply for delivering water to the last of the chambers.

3. A continuous wood pulp fiber washing mechanism constructed in accordance with claim 1:

wherein said wire is a looped wire traveling over supporting rolls and the pulp fibers pass between the interior of the wire and a roll with the pulp fibers being carried between a roll and the wire in said last chamber and the pulp being removed from the surface of the roll after it is elevated out of the chamber.

4. A continuous wood pulp fiber washing mechanism constructed in accordance with claim 1:
including means for measuring the level of the liquid in the first bath and means for adding water to the last bath as a function of said level while continuously removing a portion of the water drained from the first bath.

* * * * *

UNITED STATES PATENT AND TRADEMARK OFFICE
CERTIFICATE OF CORRECTION

PATENT NO. : 4,549,415
DATED : Oct. 29, 1985
INVENTOR(S) : Edgar J. Justus

It is certified that error appears in the above-identified patent and that said Letters Patent are hereby corrected as shown below:

Claim 1, Column 4, line 35, please insert --first-- between "said" and "chamber,".

Signed and Sealed this

Twenty-eighth Day of January 1986

[SEAL]

Attest:

Attesting Officer

DONALD J. QUIGG

Commissioner of Patents and Trademarks